(12) United States Patent
Doherty

(10) Patent No.: US 7,434,577 B2
(45) Date of Patent: Oct. 14, 2008

(54) SOLAR AIR HEATER

(76) Inventor: Paul M. Doherty, 307 Prospect St., Stoughton, MA (US) 02072

( * ) Notice: Subject to any disclaimer, the term of this patent is extended or adjusted under 35 U.S.C. 154(b) by 221 days.

(21) Appl. No.: 11/364,293

(22) Filed: Feb. 28, 2006

(65) Prior Publication Data

US 2007/0199562 A1    Aug. 30, 2007

(51) Int. Cl.
*F24J 2/24* (2006.01)

(52) U.S. Cl. .................. 126/651; 126/572; 126/585; 126/663; 126/675; 126/652; 126/628

(58) Field of Classification Search .......... 126/572, 126/583, 585, 586, 593, 595, 596, 628, 629, 126/631, 632, 634, 637, 646, 651–677
See application file for complete search history.

(56) References Cited

U.S. PATENT DOCUMENTS

| | | | | | |
|---|---|---|---|---|---|
| 2,680,437 | A | * | 6/1954 | Miller | 126/649 |
| 2,680,565 | A | * | 9/1954 | Lof | 126/591 |
| 3,875,925 | A | * | 4/1975 | Johnston | 126/643 |
| 3,987,786 | A | * | 10/1976 | Keyes et al. | 126/400 |
| 4,026,268 | A | * | 5/1977 | Bartos et al. | 126/626 |
| 4,030,477 | A | * | 6/1977 | Smith | 126/695 |
| 4,034,736 | A | * | 7/1977 | Telkes | 126/647 |
| 4,038,969 | A | * | 8/1977 | Smith | 126/665 |
| 4,062,346 | A | * | 12/1977 | Rapp et al. | 126/649 |
| 4,064,868 | A | * | 12/1977 | Nussbaum | 126/588 |
| 4,067,316 | A | * | 1/1978 | Brin et al. | 126/671 |
| 4,068,652 | A | * | 1/1978 | Worthington | 126/603 |
| 4,090,494 | A | * | 5/1978 | Borst et al. | 126/667 |
| 4,092,978 | A | * | 6/1978 | Levine | 126/675 |
| 4,098,262 | A | * | 7/1978 | Peters | 126/647 |
| 4,126,270 | A | * | 11/1978 | Hummel | 126/631 |
| 4,141,339 | A | * | 2/1979 | Weinstein | 126/621 |
| 4,159,707 | A | * | 7/1979 | Miquel | 126/702 |
| 4,203,428 | A | * | 5/1980 | Fodor | 126/674 |
| 4,211,213 | A | * | 7/1980 | Nissen et al. | 126/563 |
| 4,262,657 | A | * | 4/1981 | McCullough et al. | 126/617 |
| 4,262,659 | A | * | 4/1981 | Brzezinski | 126/667 |
| 4,286,576 | A | * | 9/1981 | McClelland | 126/617 |
| 4,313,429 | A | * | 2/1982 | McAlaster | 126/667 |
| 4,316,449 | A | * | 2/1982 | Fodor | 126/632 |

(Continued)

OTHER PUBLICATIONS

Ray Wolf, "Solar Air Heater," Rodale Plans, 1981.

(Continued)

*Primary Examiner*—Steven B. McAllister
*Assistant Examiner*—Andrew St. Clair
(74) *Attorney, Agent, or Firm*—David J. Wilson

(57) ABSTRACT

This invention provides novel devices and methods for the heating of air with solar radiant energy. The devices of the present invention feature a housing partitioned into essentially isolated sections wherein the sections are in fluid communication with each other through a plurality of channels located within the partitions. The two unique features of the invention, essentially isolated sections and partitions comprising a plurality of channels, increase the temperature achieved by the solar heater by 1) creating multiple, sequential sections that function independently of each other providing a higher starting temperature in each section and, therefore, a higher final temperature, 2) providing second means of heating the air within the channels located within the partitions and, 3) by virtually eliminating the mixing of incoming cold air with the heated air of the solar air heater.

15 Claims, 5 Drawing Sheets

U.S. PATENT DOCUMENTS

| | | | |
|---|---|---|---|
| 4,323,053 A * | 4/1982 | McCullough et al. | 126/649 |
| 4,342,307 A * | 8/1982 | Tuck | 126/674 |
| 4,378,786 A * | 4/1983 | Comeau, Jr. | 126/631 |
| 4,409,960 A * | 10/1983 | Balzer | 126/633 |
| 4,416,255 A * | 11/1983 | Secamiglio et al. | 126/631 |
| 4,432,346 A * | 2/1984 | Westerstrandh et al. | 126/669 |
| 4,471,761 A * | 9/1984 | Pearson et al. | 126/628 |
| 4,489,709 A * | 12/1984 | Balzer | 126/569 |
| 4,517,958 A * | 5/1985 | Worf | 126/630 |
| 4,791,910 A * | 12/1988 | Ishida et al. | 126/570 |
| 4,846,151 A * | 7/1989 | Simko, Jr. | 126/658 |
| 5,645,045 A * | 7/1997 | Breslin | 126/669 |
| 5,851,309 A * | 12/1998 | Kousa | 136/248 |
| 5,894,837 A * | 4/1999 | Groesswang | 126/666 |
| 5,935,343 A * | 8/1999 | Hollick | 136/246 |
| 6,109,258 A * | 8/2000 | Rylewski | 126/702 |
| 7,063,126 B1 * | 6/2006 | Morris | 165/53 |
| 2004/0025864 A1* | 2/2004 | Aronds | 126/669 |
| 2004/0154615 A1* | 8/2004 | Komano et al. | 126/629 |

OTHER PUBLICATIONS

Bevil and Brandt, Solar Energy, 12:19-29, 1968.

\* cited by examiner

SOLAR AIR HEATER

BACKGROUND OF INVENTION

The invention relates generally to solar air heaters. Most solar air heaters work on the same principle as a greenhouse wherein sunlight is converted to heat within a glass or plastic covered enclosure. The heat is then trapped in the enclosure by the glass or plastic. Solar heating is an economical way for persons to augment the heating of homes and other buildings. The devices can be economical to build or buy and energy from the sun is free. Still, prior art devices are not as efficient as homeowners or other building owners would like. The reason for this, at least in part, is because cold incoming air is allowed to mix with the heated air in the solar air heater. Such mixing decreases the average temperature of the air in the heater and, thus, reduces the overall efficiency of the heater.

Prior art solar air heaters have tried to increase efficiency by one or more of, for example, increasing the size of the heater, increasing the surface area for radiant energy absorbance within the heater without increasing external surface area or increasing the layers of clear, transparent or translucent material covering the device. One prior art solar air heater is described in the book "Solar Air Heater" (Ray Wolf, Rodale Plans, 1981). This solar air heater tries to increase efficiency by increasing the surface area of the heater. This heater is described as a 4 foot by 8 foot enclosed space covered with translucent fiberglass cloth where cold room air is forced into the device at the base, heated by solar energy and then expelled from outlets at the top back into the room. The enclosure is one large area where cold air can mix with warmer air thereby bringing down the average temperature of the air within the device and, thus, lessening the temperature of the air being expelled back into the room. Additionally, the device is designed to permanently mount on an external wall of the building. Many homes may not have such an expanse of wall space conveniently located for both best sun exposure and best room air exchange.

Another example of a prior art solar air heater is described in U.S. Pat. No. 4,034,736 to Telkes. This design uses a plurality of parallel, horizontally disposed slats resembling a venetian blind thereby increasing the surface area where sunlight may strike and warm the air. Still, this device has the problem of a reduced average temperature since it also permits the mixing of incoming cold air with the warm air in the device.

Other heaters trying to achieve the goal of increasing the surface area of where sunlight may strike have been described. One heater uses highly polished aluminum fins to increase the surface area of solar energy absorbing material without increasing the overall dimensions of the device (see, Bevil and Brandt, Solar Energy, 12:19-29, 1968).

In another prior art device, McCullough (U.S. Pat. No. 4,262,657) increases the efficiency of a solar air heater by utilizing a clear glass or plastic honeycomb-style structure either directly behind the front panel or directly on top of the collector plate (i.e., the back panel) to block reradiation loss and by utilizing a vertical porous solar energy absorbing material through which the air passes to be heated. This design of McCullough, although an improvement over other prior art designs, only minimizes the mixing of cold incoming air with heated air. This is because the vertical porous panel of McCullough extends over the entire area of the heater. Since the system is not designed to ensure positive pressure evenly over the entire surface of the vertical porous panel nor reduce or eliminate airflow eddies, the system permits the back flow of air through the vertical porous panel resulting in loss of efficiency by the heater.

Still other prior art solar air heaters have tried to increase efficiency through tighter construction, insulating the device and increasing the number of transparent or translucent covers. However, all of the prior art solar air heaters known by the Inventor fail to address the problem of cold incoming air mixing with heated air.

What is needed is a solar air heater with increased efficiency over prior art solar air heaters.

SUMMARY OF INVENTION

In one aspect, the invention relates to a solar air heater wherein the enclosed space within the device housing is divided into at least two essentially isolated sections by a partition. The partition(s) of the present invention solar air heater are parallel to each other and to the top and bottom panels of the enclosure. The partition(s) of the enclosure contact the side panels perpendicularly and contact the front and back panels at a non-perpendicular angle. Furthermore, the partitions of the present invention comprise a plurality of channels allowing adjacent sections to be in fluid communication with each other. The channels are small enough in diameter to prevent any significant back flow of air. This design not only solves the prior art problem of incoming cold air mixing with the heated air within the heater but also provides the unsuspected benefit of increased heater efficiency by heating the air in a step-wise manner. This step-wise heating of the air, where the heated air of one section provides the starting air of the next adjacent section, results in a greater temperature gain as compared to a similar sized device not incorporating the step-wise heating technology of the present invention. Additionally, the partitions of the solar heater of the present invention also aid in the heating of the air. The partitions of the present invention, in one embodiment, are made of materials and or colors which are known to absorb solar radiant energy thereby proving additional heating of the air as it passes through the channels of the partitions.

DETAILED DESCRIPTION OF PREFERRED EMBODIMENTS

Figure 1:
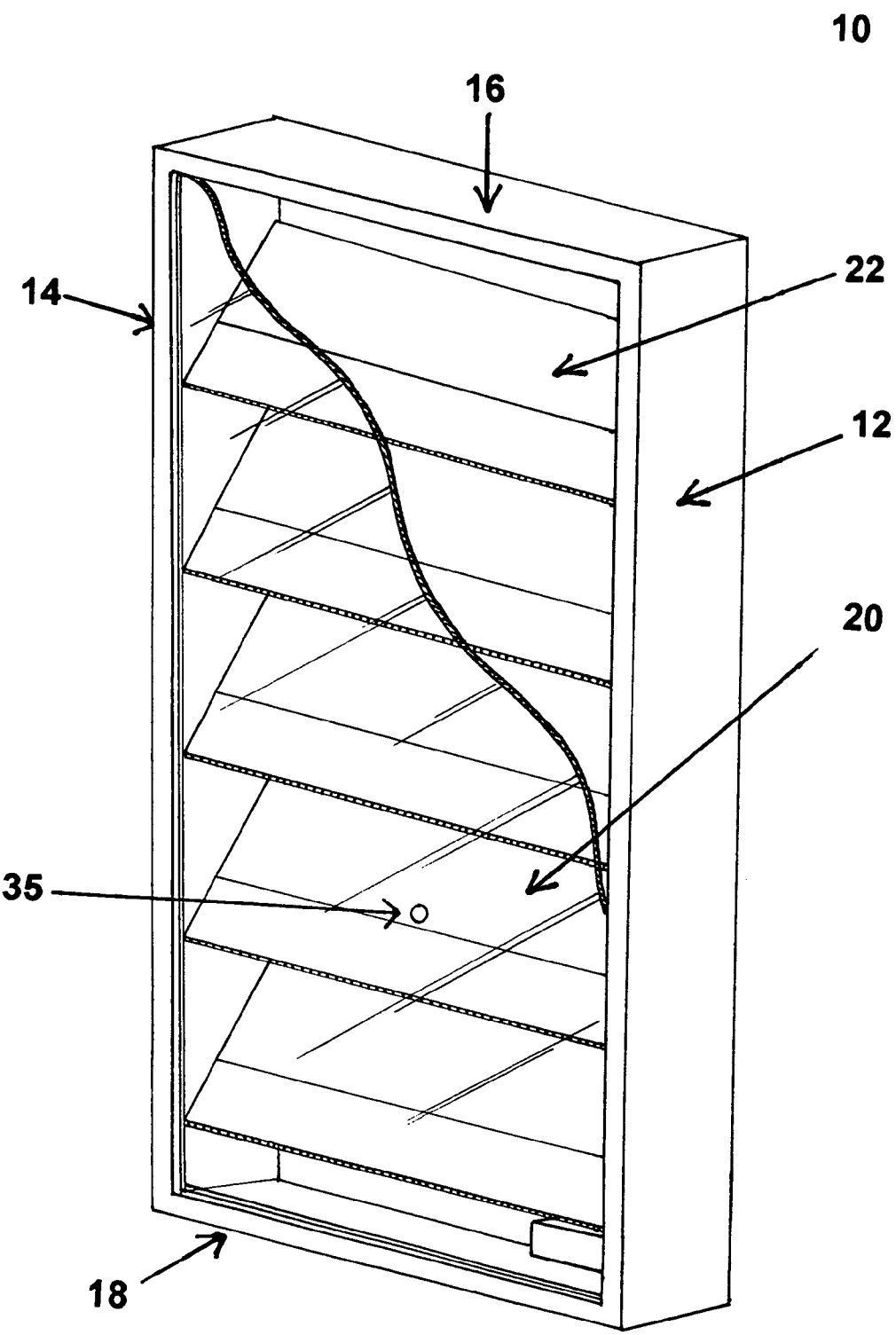
FIG. 1 shows a schematic diagram of the solar air heater of the present invention at a three-quarter view.

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While the invention has been described with respect to a limited number of embodiments, those skilled in the art, having benefit of this disclosure, will appreciate that other embodiments can be devised which do not depart from the scope of the invention as disclosed herein.

General Description of the Solar Air Heater of the Present Invention.

The present invention relates to a solar air heater for providing heat to a building interior either as the sole heat source or to augment existing heat sources. The heater works, in one embodiment, by drawing interior air out of a building, forcing the air through a series of sections essentially isolated (i.e., separated) from each other by partitions where the passage of air to adjacent sections is through a plurality of channels within the partition. The air is drawn out of the building and into the heater (and, after heating, forced back into the building) by one or more fans. The partitions of the invention are arranged parallel to each other, attached perpendicularly to two side panels and at non-perpendicular angles to the front and rear panels. In the context of the present invention, the term "perpendicular" means at or near a 90° angle (e.g., 90°± about 5°). Furthermore, in the context of the present invention, the term "non-perpendicular" means at any other angle than that defined for the term perpendicular. Still further, in the context of the present invention, the term "parallel" means of essentially equal distant along the length and breadth of one surface of one panel or partition with the surface of, for example, an adjacent panel or partition.

The front panel of the heater is made of translucent or transparent material to permit the flow of solar radiant energy into the heater. After passing through the essentially isolated sections via the plurality of channels within the partitions, the heated air is forced back into the interior of the building with the fan(s). The solar air heater is controlled by a temperature sensor or sensors located within the housing. The sensor(s) i) detect the internal temperature of the heater, ii) the temperature information is conveyed to a temperature controller and iii) the controller turns the fan(s) on or off at a preset temperature(s). In this way, the heater will provide heat when the temperature inside the heater rises (such as on a sunny or brightly overcast day) and will turn off when the temperature inside the heater lowers (such as on rainy days or at night) and it is not providing heat.

Non-Limiting Theory of the Solar Air Heater of the Present Invention.

Although the solar air heater of the present invention is not limited by theory, it is believed that the heater provides superior heat as compared to other prior art solar air heaters though the incorporation of two novel and non-obvious innovations. As with prior solar heaters, the air is heated through the "solar greenhouse effect." Sunlight passes through the transparent or translucent front panel of the solar heater. It heats the air inside the heater because the sun's incoming electromagnetic radiation warms the interior surfaces inside the heater. Air warmed by the heat from hot interior surfaces is retained in the heater by the panels creating the housing of the heater and by the air itself. In other words, the heater works by letting in solar radiation and trapping the energy from that radiation to increase and maintain the internal temperature of the heater above that of the temperature outside.

In the present invention, this greenhouse effect of the heater is enhanced by dividing the solar air heater of the present invention into sections that are essentially isolated from each other by partitions. The partitions comprise a plurality of channels (such as those seen in, for example, a corrugated material) wherein the air flowing through the solar air heater can pass form one section to the adjacent section. In other words, the partitions both create the individual sections of the heater and provide for fluid communication between the sections. Because of this design, the air passing through the solar air heater has a higher initial temperature in each section as compared to the previous section thereby allowing a higher temperature to be achieved than without the sections. This design facilitates the ability of the solar air heater of the present invention to achieve higher temperatures than prior art solar air heaters or achieve the same temperature of prior art solar air heaters in less space. In addition, the partitions also contribute to the design of the device in another way. Since the partitions, in one embodiment, are made of material capable of absorbing solar radiant energy (e.g., metal, surfaced with metal or coated with a metal-based paint) a or colored (e.g., black or other dark color) to increase absorption of solar radiant energy, the partitions also contribute to increasing the temperature of the air passing through the device by heating the air passing through the partitions. Although the present invention is not limited to any particular theory, it is believed that this happens because the material of the partitions absorbs heat energy generated by the solar radiant energy of the sun and then transfers the heat energy to the air passing through the channels in the partitions. Said heat energy may also pass through the partitions and aid in the heating of the air of the adjacent section.

Detailed Design and Non-Limiting Alternative Embodiments of the Solar Air Heater.

The present invention comprises a solar air heater. The solar air heater of the present invention comprises a housing. The housing of the solar air heater may be in any shape or conformation compatible with the use of this invention. A preferred conformation of the solar air heater of the present invention is a square or rectangular shape and of the size to fit into a window frame. The depth of the solar air heater (i.e., the distance between the front and back panels), in one embodiment, is about 2 to 24 inches and in a more preferred embodiment about 3 to 9 inches. In another embodiment, the solar heater may also have a light-transmitting back panel so that light may pass through the heater and into in interior of the building. In this way, the solar air heater of the present invention heats the room air but still permits ambient light to enter the room.

The present invention also contemplates that the solar window heater of the present invention may be in other shapes (i.e., not square or rectangular) depending on location chosen for the use of the solar air heater or desired size and desired ornamentation of the solar air heater. For example, windows of non-standard shapes (e.g., trapezoidal, semi-circular or circular shaped windows) would require a solar air heater of the present invention to be in trapezoidal, semi-circular or circular shapes. Solar air heaters of the present invention need not be mounted in a window and, therefore, would not be limited to the shapes of windows. The solar air heater of the present invention may, for example, be shaped to fit an external wall area or be designed to be detached from the building that it heats. For example, the solar air heater of the present invention may replace conventional shutters often found on homes and other buildings. This is possible since the use of slanted partitions in the solar air heater of the present invention the heater resembles shutters that are often found on either side of a window. Thus, in still yet another embodiment, the solar air heater may be made to replace conventional shutters thereby providing heated air while not blocking the window and maintaining a conventional appearance to the house or building. In other embodiments, the shape of the solar air heater may be any shape that permits the flow of air through the heater. In yet other embodiments, the solar air heater of the present invention may have ornamental shapes (e.g., it could be made in the profile of a house or barn).

The solar air heater of the present invention has one or more air inlets and one or more air outlets. In one embodiment, the air inlet(s) cover a area equal to about 1% to about 10% of the area of the back panel of the solar air heater and the air outlet(s) cover a area equal to about 1% to about 10% each of the area of the back panel of the solar air heater. In a preferred embodiment, the air inlet(s) cover an area equal to about 1% to 5% of the total area of the back panel of the solar air heater and the air outlet(s) cover an area equal to about 1% to 5% of the total area of the back panel of the solar air heater. Although the area of the air inlet(s) and air outlet(s) are measured in relation to the surface area of the back panel, one in the art will recognize that the actual air inlet(s) and outlet(s) need not necessarily be located in the back panel of the solar air heater. For example, depending on the orientation or mounting of the solar air heater of the present invention, the air inlet(s) and air outlet(s) may be located on the top, bottom sides or front of the solar air heater of the present invention. In another embodiment, the inlet(s) and outlet(s) of the solar air heater are located in the sections of the housing at opposite ends of the heater. Thus, if the solar air heater of the present invention has a vertical orientation with the partitions of the solar air heater in horizontal orientation, the air inlet(s) would be, for example, located in the bottom most section of the housing and the air outlet(s), for example, would be located in the upper most section of the housing.

The solar air heater of the present invention comprises a temperature controller for turning the fans of the heater on and off. In one embodiment, the temperature controller of the present invention is electrically connected to a temperature sensor(s) for measuring the temperature of the air inside the heater. The temperature reading of the sensor is then electrically relayed to the temperature controller and an optional data recording means. The temperature controller then electrically relays a signal to the fan(s) to turn the fan(s) on or off once preset temperatures are obtained. A temperature controller of the present invention may be, for example, a self-contained electronic device comprising, for example, a microchip, or a personnel computer. The temperature controller of the present invention may also serve other functions such as displaying the temperature in the heater, room and/or outside the building or sending data to a data recording device. The temperature controller may also be used to, for example, adjust settings (e.g., temperatures at which the fan(s) turn on/off).

Non-Liming Description of One Embodiment of the Solar Heater of the Present Invention.

Figure 2:
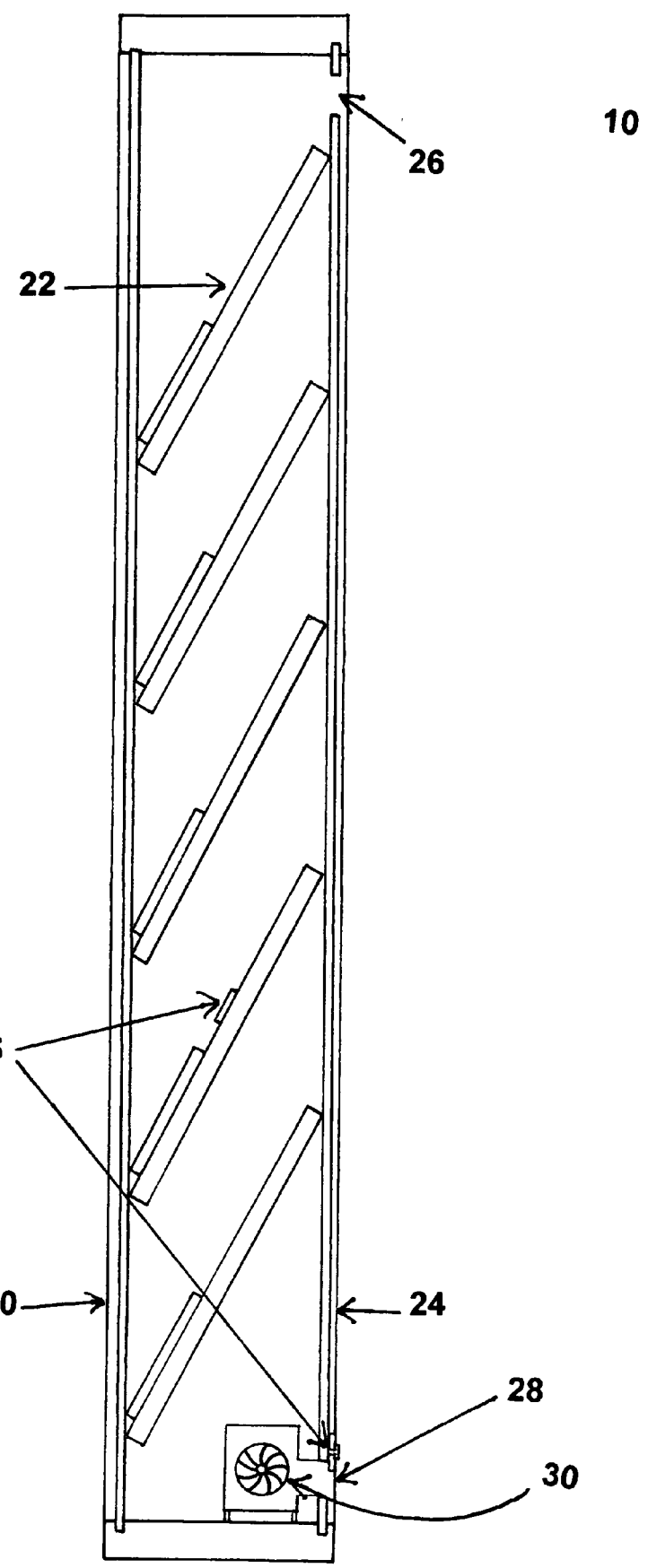
FIG. 2 shows a schematic diagram of a side view of the solar heater of the present invention.

Referring now to FIG. 1, one embodiment of the solar air heater 10 of the present invention comprises two side panels 12 and 14, a top panel 16 a bottom panel 18 a light-transmitting front panel 20 and one or more partitions, e.g., 22. We continuing now to FIG. 2 where a side view of one embodiment of the present invention is shown. The solar air heater 10 of the present invention further comprises a back panel 24, one or more air inlets 26, one or more air outlets 28, at least one fan 30, a temperature sensor 35 (which is optionally shown located on a panel and/or near the air outlet and is for determining the temperature of the air within the heater and ultimately for the operation of the fan(s)) and one or more partitions (e.g., 22) that essentially isolate adjoining sections (e.g., 34) from each other. Also shown are optional solar cells 32 (with or without batteries for power storage) for generating electricity to operate the fan(s) 30 of the solar air heater. Alternatively, said fan(s) may be powered by, for example, batteries, an external power source (e.g., a 12-volt wall outlet) or a combination thereof of any of the aforementioned contemplated power sources.

Figure 3:
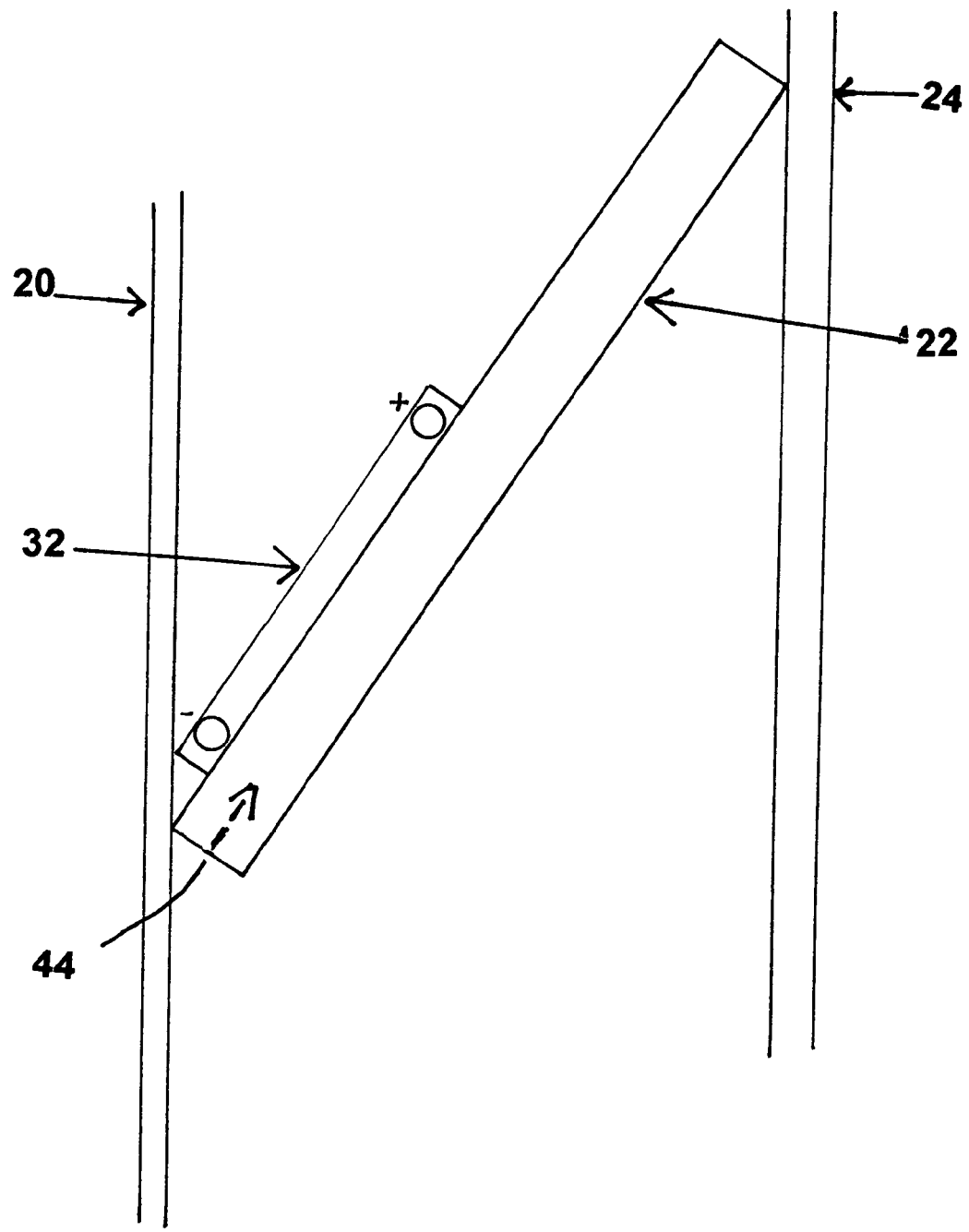
FIG. 3 shows a schematic diagram of one partition of the solar air heater of the present invention with particular emphasis on the flow of air through the channels within the partition.

FIG. 3 shows a close-up view of one of the partitions 22 of the solar air heater of the present invention. This Figure shows how the partition 22 comes into contact with the back panel 24 and light-transmitting front panel 20 of the solar air heater. FIG. 1 shows how the partitions 22 of the present invention also come into contact with the side panels 12 and 14 of the solar air heater. FIG. 3 also shows how the partitions of the present invention permit adjacent sections to be in fluid communication with each other by permitting the flow of air between the adjacent sections through a plurality of channels 44 located within the partitions. Additionally, FIG. 3 shows how the partition(s) of the present invention may, optionally, be layered with a solar radiant energy absorbing material such as, for example, metal, a metal-based paint or dark color and/or have an optional solar cell 32 for power generation.

Figure 4:
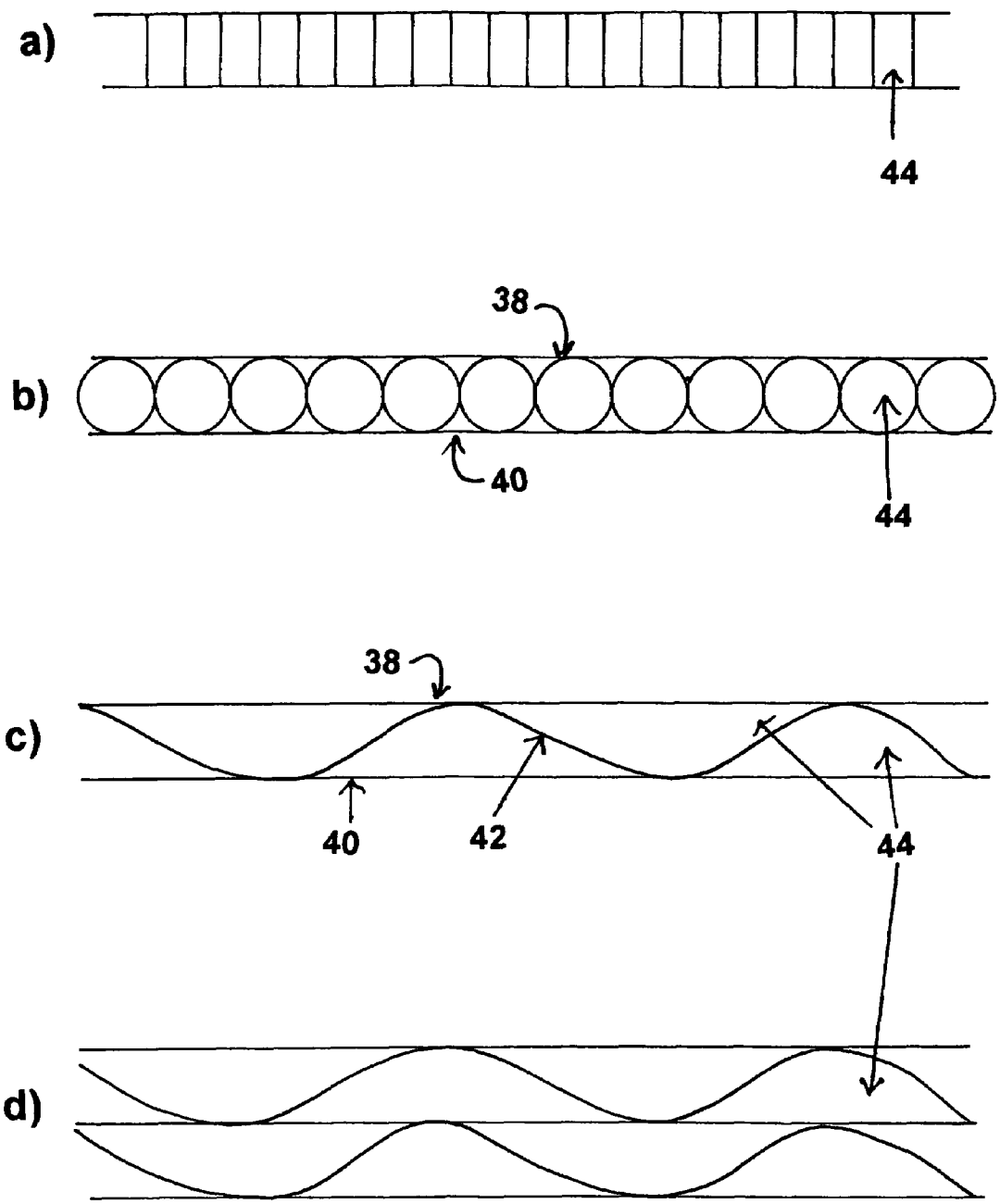
FIG. 4 shows a front view of one of the partitions of the present invention with particular emphasis on the channels passing through the partition.

FIG. 4 illustrates four non-limiting embodiments of the channels 44 passing through the partition(s) of the present invention. FIG. 4*a* shows how the tubes of the partition may additionally be enclosed within a top panel 38 and bottom panel 40. FIG. 4*b* shows a partition 22 wherein the channels 44 are made of tubes 36 attached to each other in sequence along their lengths. FIG. 4*c* shows how the channels 44 of the partition(s) may be made within a top 38 and bottom panel 40 by forming a third panel (the mid panel 42) between the top and bottom panel wherein the mid panel 42 is serpentine (i.e., looks line a sine wave or zig-zag from a head on view) effectively dividing the partition into a plurality of channels 44. In yet another embodiment, the channels 44 found in the partition(s) of the present invention may form an array or matrix wherein the channels 44 are layered (e.g., on top of each other: see, FIG. 4*d* for one example of this embodiment). In a preferred embodiment, the top and bottom panels of the partitions are between about ⅛ and ⅜ inches apart or between about ⅛ and ⅜ inches apart for each layer of the partition fi the partition has more than one layer.

Non-Liming Description of a Method of Providing Heated Air with the Solar Heater of the Present Invention.

One method of heating air with the solar air heater of the present invention comprises drawing room air into the solar air heater 10 through one or more air inlets 26 with fan(s) 28. The air then passes sequentially from the first section 34 of the solar air heater 10 through the channels 44 of a partition 22 and into the next section of the solar air heater, and so forth, until heated air exits at the air outlet(s) 28. Solar energy passing through the light-transmitting front panel 20 heats the air as it passes through each section and through the channels of each partition. Although the solar air heater of the present invention is not limited by theory, it is believed that the air passing through the solar air heater is heated by the interior surfaces (e.g., the surfaces of the partitions and panels) which have become hot by solar radiant energy. Thus, the air is heated both within the individual sections and as it passes through the channels of the partitions. In other words, the air is heated because the heat generated by the solar radiant energy hitting the surfaces of the solar air heater transfers into the air passing through the sections and the channels of the partitions. Although the solar air heater of the present invention is not limited by theory, the novel design of the solar air heater of the present invention (i.e., the multiple sections that air essentially isolated from each other) ensures that mixing of air between the cooler incoming air and each of the subsequent sections of the heater is essentially minimized if not eliminated. Because of this design, the air is heated to a greater degree in each section and as it passes through the channels of each partition creating a more efficient solar air heater over the prior art designs. Additionally, the solar air hater of the present invention may have the flow of air in any orientation (e.g., top-to-bottom, bottom-to-top, side-to-side).

The solar air heater of the present invention may be controlled by temperature sensor(s) and/or a temperature controller device. One or more temperature sensors 35 are located within the heater preferably, but not necessarily, near the air outlet(s) 28. The temperature sensor(s) may also be located in other places as desired or needed. When the air temperature of the air inside the solar air heater reaches a preset temperature the temperature sensor will send a signal to a controller which, in turn, will relay the signal to the fan(s) to turn the fan(s) on. If the air temperature inside the solar air heater drops below a preset temperature (e.g., at night or during overcast days) the temperature sensor will send a signal the controller which, in turn, will relay the signal to the fan(s) to turn the fan(s) off. Optionally, the solar air heater may additionally be controlled by a temperature sensor located within the room to be heated by the solar air heater. For example, when the room temperature sensor reaches a low preset temperature it will send a signal to the temperature controller that, in turn, will send a signal to the solar air heater of the present invention. If the temperature sensor of the solar air heater of the present invention has reached it's preset temperature, the fan(s) will turn on and blow heated air into the room. If the temperature sensor of the solar heater has not reached it's preset temperature, the fan(s) will not turn on until such time as the temperature sensor of the solar air heater does reach it's preset temperature. Likewise, if the room temperature sensor detects that the room air is hot enough, the room temperature sensor will send a signal to the solar air heater of the present invention to shut the fan(s) of the solar air heater off. One skilled in the art will see that various temperatures may be set on both the solar air heater temperature sensor and the room temperature sensors depending on, for example, the time of day.

Here we list three non-limiting examples of temperature sensors. For example, in one embodiment, the temperature sensor(s) may comprise a "snap disk" type temperature sensor. A snap disk is a device that responds to changes in temperature. For example, a change in temperature may cause a bimetallic portion of the snap disk to expand and, once a preset temperature is reached, the bimetallic portion "snaps" into a different configuration thereby causing an electrical circuit to be completed and, thus, sends a signal to a temperature controller which, in turn, sends a signal to power to fan(s). Other types of "snap disk" style temperature sensors may utilize, for example, alcohol that expands as the temperature increases and contracts as the temperature lowers. Upon higher temperatures, for example, the alcohol would expand and cause a bellows-type device to expand. Once the bellows is fully expanded the device would complete the required electrical circuit and power would be sent to the fan(s).

A third example of a temperature sensor of the present invention is a thermistor. A thermistor is a type of resistor used to measure temperature changes by responding to the change in it's resistance with changing temperature. In other words, a thermistor registers temperature based on voltage resistance. Thermistors can be either positive (resistance increases with rising temperature) or negative (resistance decreases with increasing temperature). Unlike "snap disk" type temperature sensors, a thermistor can have the temperature at which it completes an electrical circuit changed variably by a control unit device. Non-limiting examples of thermistors suitable for use in the present invention include those manufactured by Quality Thermistor, Inc. (Boise, Id.) and U.S. Sensor, Inc. (Orange, Calif.).

One skilled in the art will also see that the temperature sensor(s) of the present invention may make up a portion of the temperature control system. In one embodiment of the present invention, temperature sensors are mounted within the solar air heater of the present invention and are electrically connected to a temperature control device. An example of a suitable control device is a computer (e.g., a self-contained unit comprising a microcontroller or a personnel computer). Such a device, in addition to regulating the fan(s) of the solar air heater of the present invention, may also, for example, display the temperature of the heater or room, comprise an input device for adjusting settings or include an optional data logger to record temperature and other data (e.g., time of day the fan(s) are cycled on or off, room temperature, outside temperature) for later analysis or printing.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for.

Example 1

This example shows the ability of the solar air heater of the present invention to generate heated air.

Figure 5:
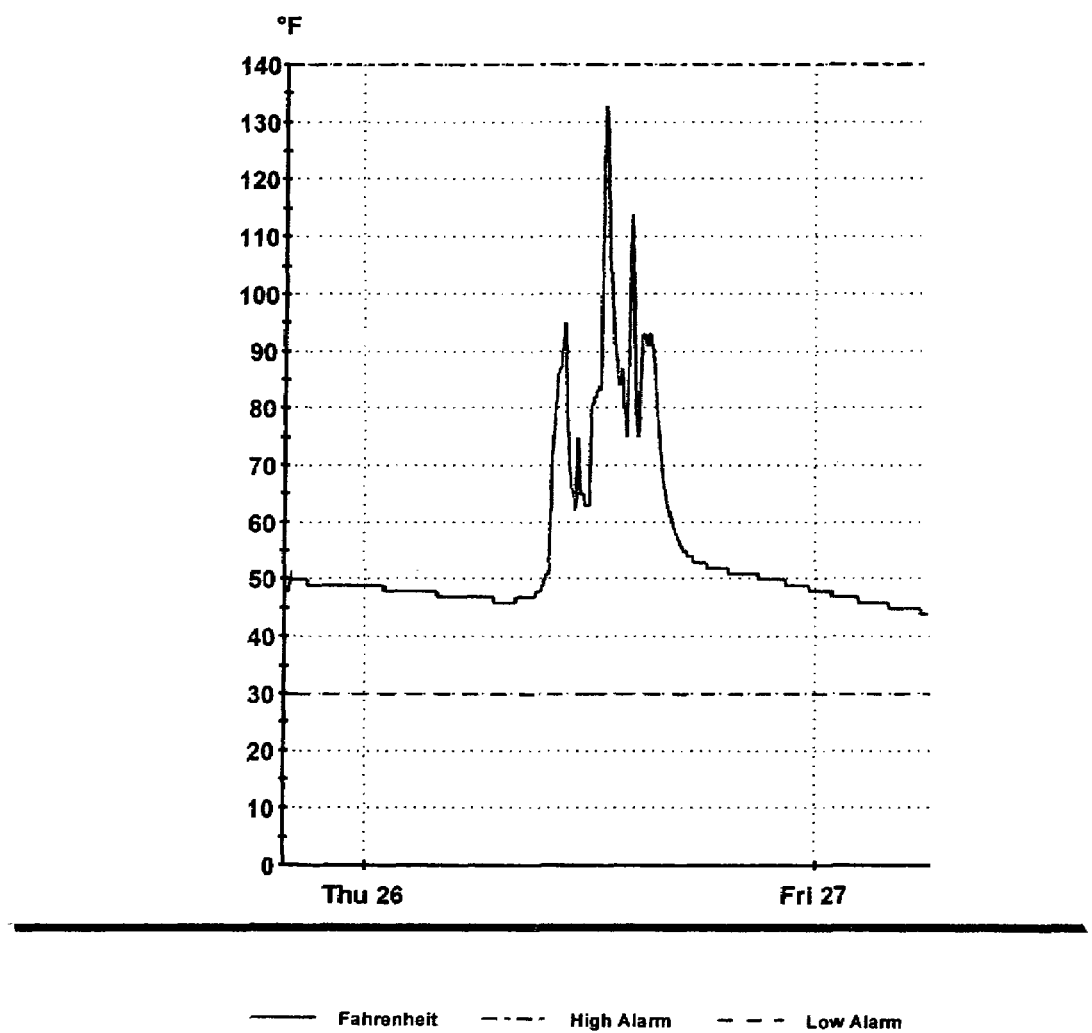
FIG. 5 shows a graph showing the temperature of air heated by the solar air heater of the present invention.

In this example, the solar air heater of the present invention was operated over a period of 24 hours. The ambient room temperature for the period in which the solar air heater of the present invention was operated varied between a low of 43.3° F. before the heater was used to a high of 63.3° F. after operation of the heater. The room was subject to no other heating devices. The graph in FIG. 5 shows the temperature of the air within the solar air heater of the present invention over a period of 24 hours in ° F. Once the heater was exposed to solar radiant energy the temperature of the air within the heater increased to 133° F. The fan of the heater was set to turn on at 130° F. The temperature of the heater increased three more degrees after the fan turned on until cool room air entered into the heater in sufficient quantities to lower the internal air temperature of the heater. Once the fan turned on the internal temperature of the heater was lowered until the fans were shut off at the preset temperature of 95° F. At this point the fans of the heater cycled on and off at the internal air temperature of the heater increased and decreased. During the period in which the heater was in operation, the temperature of the room increased 20° F. from 43.3° F. to 63.3° F.

What is claimed is:

1. A solar air heater providing heating of air in a step-wise manner, comprising:

a housing, said housing comprising a front panel of light-transmitting material, one or more air inlets and one or more air outlets for establishing a flow path for the air to be heated, two or more partitions, said partitions being essentially parallel to each other creating essentially isolated sections within said housing between said partitions, wherein each partition has a longitudinal axis and a normal axis, said normal axis being perpendicular to a face of said partition, wherein each partition comprises a plurality of parallel channels permitting adjacent essentially isolated sections to be in fluid communication and wherein said fluid communication is through said partitions, such that said fluid communication between said adjacent essentially isolated sections and through said partitions is along a route perpendicular to the normal axis of each of said partitions and perpendicular to the longitudinal axis of each of said partitions; and b. one or more fans for moving air through said housing by way of said air inlets and said air outlets, and c. a temperature controller for turning said fans on and off at preset temperatures.

2. The solar air heater of claim 1, wherein said housing further comprises:

a. a back panel, a top panel and two side panels and a bottom panel;

b. wherein said light-transmitting front panel and said back panel are connected to each other by said top, bottom and side panels to create a box-like housing.

3. The solar air heater of claim 2, wherein said back, top, bottom and side panels comprise a material suitable for solar radiant energy absorbance.

4. The solar air heater of claim 2, wherein said partitions contact said front and back panels at a non-perpendicular angle and contact side panels perpendicularly.

5. The solar air heater of claim 4, wherein said partitions comprise material suitable for solar radiant energy absorbance.

6. The solar air heater of claim 5, wherein said material suitable for solar radiant energy absorbance is selected from a group consisting of one or more of metal, surfacing said partitions with metal or a metal-based paint, coloring the surfaces of said partitions a dark color (e.g., black).

7. The solar air heater of claim 6, wherein said enclosure is sized to fit into a window frame of a building.

8. The solar air heater of claim 7, wherein said back panel is made of a light-transmitting material.

9. The solar air heater of claim 1, wherein said temperature controller comprises one or more temperature sensors and a recording means.

10. The solar heater of claim 9, wherein said temperature controller comprises a computer.

11. The solar heater of claim 1, wherein said one or more air inlets are orientated to draw air from the interior of a building into said solar heater housing for heating by said solar heater and said one or more air outlets are orientated to expel heated air out of said solar heater housing into the interior of said building and wherein said one or more air inlets and said one or more air outlets are located in two different said essentially isolated sections at opposing ends of said housing.

12. The solar heater of claim 2, wherein components of said solar heater are selected from one or more of a group consisting of plastic, metal, glass, wood, fiberglass, pressboard and fiberboard.

13. A method of heating air with a solar air heater, said method comprising:

providing: a housing, said housing comprising at least one light-transmitting panel to permit the capture of solar radiant energy, one or more air inlets and one or more air outlets to create a flow path for the air to be heated, one two or more partitions, said partitions being parallel to each other and creating essentially isolated sections within said housing between said partitions, wherein each partition has a longitudinal axis and a normal axis, said normal axis being perpendicular to a face of said partition, wherein each partition comprises a plurality of parallel channels permitting adjacent essentially isolated sections to be in fluid communication and wherein said fluid communication is through said partitions, such that said fluid communication between said adjacent essentially isolated sections and through said partitions is along a route perpendicular to the normal axis of each of said partitions and perpendicular to the longitudinal axis of each of said partitions; and wherein one edge of said partition meets said light-transmitting panel at a non-perpendicular angle; one or more fans for moving air through said housing by way of said air inlets and said air outlets, and a temperature controller for turning said fans on and off at preset temperatures;

b. drawing air with said one or more fans from the interior of a building into said housing via said one or more air inlets in said housing, heating the air with solar radiant energy by drawing said air sequentially through the essentially isolated sections of said housing and through the plurality of channels in said partitions into the next section and expelling the air from the housing into the interior of said building via said one or more air outlets and by having said fans turn on when a first preset temperature inside the housing is detected by said temperature controller and turned off when a second preset temperature inside the housing is detected by said temperature controller.

14. The method of claim 13, wherein said temperature controller device composes one or more temperature sensors and a data recorder device and wherein said temperature sensors relay data to said data recorder device, the data is analyzed and a signal is sent to turn said fans on or off 15. The method of claim 14, wherein said temperature controller means comprises a computer.

* * * * *